Oct. 1, 1968  J. A. ROCHÉ  3,403,842
STALL PREVENTION IN AXIAL FLOW COMPRESSORS
Filed Jan. 3, 1967
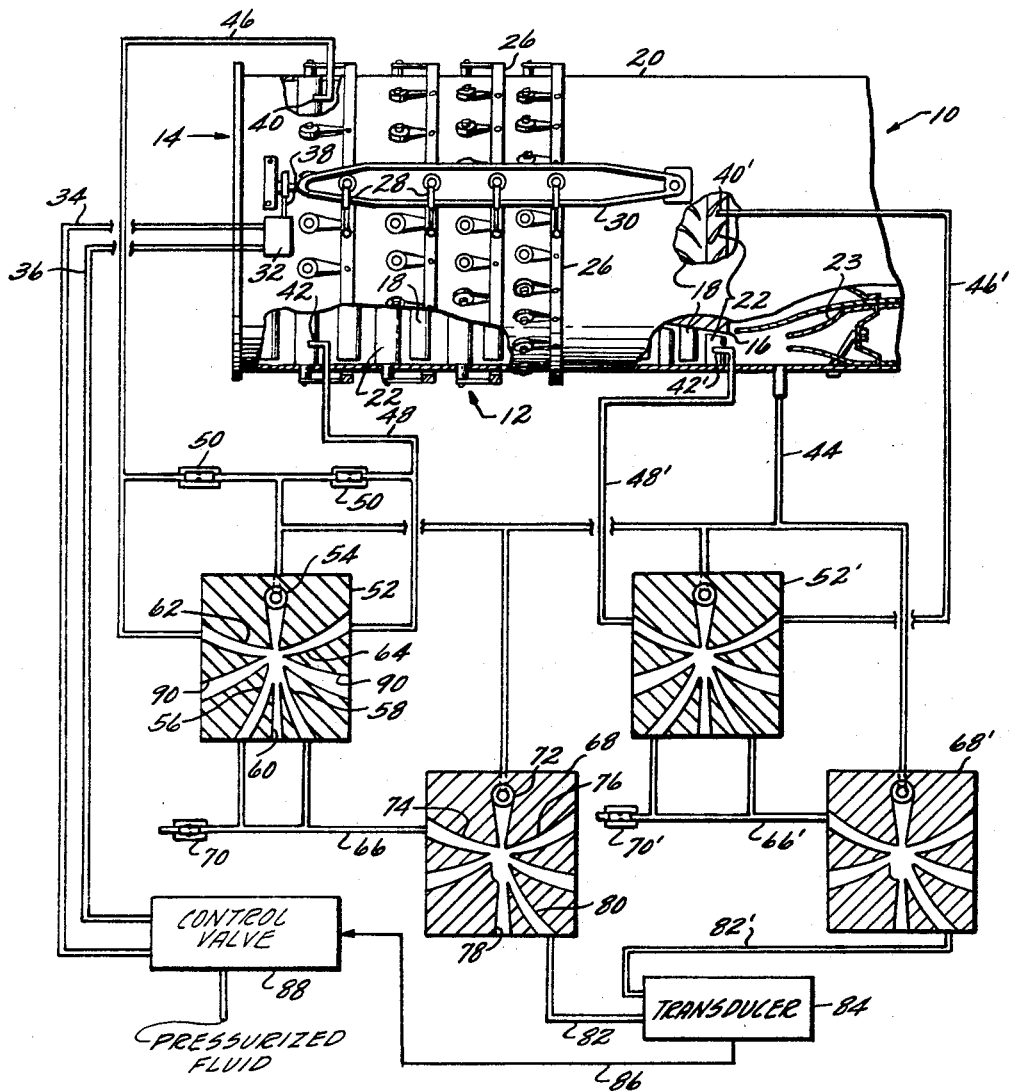
INVENTOR.
JEAN A. ROCHÉ
BY
ATTORNEY

United States Patent Office 3,403,842
Patented Oct. 1, 1968

3,403,842
STALL PREVENTION IN AXIAL
FLOW COMPRESSORS
Jean A. Roché, Reading, Ohio, assignor to General
Electric Company, a corporation of New York
Filed Jan. 3, 1967, Ser. No. 606,757
4 Claims. (Cl. 230—114)

ABSTRACT OF THE DISCLOSURE

The disclosure shows an axial flow compressor in which a pair of angularly spaced probes are provided respectively in the first and last compressor stages. Fluidic means are responsive to the pressure signals in these probes. Whenever there is a difference in the pressure signals of the two sensors of either pair, a stall warning signal is generated which causes adjustment of the compressor stator vanes to reduce the aerodynamic loading on the compressor and avoid a stall condition. The stall warning signal is generated regardless of which sensor of a given pair has a higher pressure signal.

---

The present invention relates to gas turbine engines and more particularly to the prevention of stall in axial flow compressors which are an essential component of such engines.

Axial flow compressors comprise a rotor having airfoil blades projecting radially therefrom. These blades are arranged in spaced, circumferential rows along the length of the rotor. Alternating with the rows of rotor blades are rows of stator blades which properly direct air from one row of rotor blades to another. Each adjacent row of rotor and stator blades is known as a compressor stage.

Air is pressurized as it passes through the compressor and then enters a combustor where fuel is ignited to generate a hot gas stream. This gas stream powers a turbine which, in turn, drives the compressor rotor. The remaining energy in the gas stream may be discharged from a nozzle to provide a propulsive force or employed to drive a turbine providing a rotary power output.

Air passing over the airfoil shaped, compressor blades flows in a manner essentially the same as that of air passing over an aircraft wing. If the angl eof attack of the air becomes too great for a given velocity and flow rate, a stall condition occurs resulting in the volume and pressure of air discharged from the compressor being drastically reduced. When a "gross" stall occurs, there is usually insufficient air to support combustion of fuel and the engine is no longer operational. Put another way, stall occurs when the loading on the compressor becomes too great as by an excessive pressure rise thereacross.

Obviously, failure of a gas turbine used in the propulsion of aircraft is of serious concern. Many precautions are taken to prevent a stall occurring, the most usual approach being to schedule engine operation so that at all times the loading on the compressor is maintained safely below a stall condition. This is a known technique in the art and determines such things as engine acceleration and further interrelated factors as fuel flow and effective inlet and outlet areas for the compressor.

While the stall characteristics of a given compressor are predictable as regards to its loading, the need for safety necessitates operation in many instances considerably below the maximum compressor loading available. Further, the margin of safety provided can, in some instances, prove insufficient where there has been damage to the compressor or where certain highly abnormal operating conditions are encountered.

For these reasons, it has been recognized that some means of taking corrective action to reduce compressor loading should be provided before a "gross" stall occurs. However, there have been no proposals to fill this need which have had the desired simplicity and reliability particularly requisite for aircraft engine operation.

Accordingly, one object of the invention is to provide simple and reliable means for the prevention of "gross" stall of axial flow compressors at the same time permitting maximum loading of the compressor consistent with its physical condition.

These ends are broadly attained by providing, in an axial flow compressor, a pair of pressure sensors angularly spaced relative to one of the compressor stages. When the compressor is operating normally, the pressures sensed by the sensors are substantially equal. It has been discovered that, in many compressor designs, prior to "gross" stall, "pocket" stalls occur where there is a loss of pressurization in a portion of a compressor stage. Such a "pocket" stall is sensed by a pressure differential of the pressure sensors. Means are then provided which are responsive to this pressure differential which reduces the loading on the compressor and eliminates the "pocket" stall before a "gross" stall can occur. In this fashion, effective operation of the compressor can be maintained.

Preferably and advantageously, fluidic means are employed to generate a stall warning signal which actuates the means for reducing the load on the compressor. The stall warning signal is derived from fluid amplifier means which are responsive to fluid pressure signals from the pressure sensors, and preferably comprises a fluid amplifier having a pair of control ports connected to the pressure sensors. Whenever either pressure signal is higher, a power stream is deflected into one or another of laterally spaced receivers which are connected to a common conduit or passageway in which the stall warning signal is generated.

It has also been found preferable to reduce the loading on the compressor by employing the described system in combination with an axial flow compressor having means for adjusting the effective angle of the stator blades of at least a portion of the stages of an axial flow compressor.

The above related objects and features of the invention will be apparent from a reading of the following description of the disclosure found in the accompanying drawings and the novelty thereof pointed out in the appended claims.

The single figure in the drawing is a schematic showing of a stall prevention system for controlling the loading on an axial flow compressor in accordance with the present invention.

The drawing illustrates the forward portion of a gas turbine engine 10 and particularly the axial flow compressor 12 customarily used in such engines. The compressor 12 has an inlet at 14 and comprises a rotor 16 having airfoil shaped blades 18 projecting therefrom and arranged in spaced, circumferential rows. The compressor 12 further comprises an outer casing 20 having circumferential rows of blades 22 projecting therefrom and alternating with the rows of rotor blades 18. Adjacent rows of rotor and stator blades are referred to as compressor stages.

Preferably, the compressor 12 is of the so-called variable geometry type wherein the stator blades of at least the first several compressor stages are pivotally adjustable about axes radial of the rotor axis in order to control the volume of air flowing through the compressor beyond the control provided by speed of compressor rotor rotation. At this point, it will be noted that the compressor rotor is connected to a turbine, which is driven by a hot gas stream generated in a combustor 23, common to gas turbine engines as they are known today.

To provide for adjustment of the stator vane angle, each adjustable stator has a lever arm projecting therefrom which is connected to an actuator ring 26. The several actuator rings 26 are then connected by links 28 to a lever 30. The lever 30 is positioned by an actuator 32, having power fluid connections 34, 36 at its opposite ends. Movement of the output rod 38 of the actuator thus can simultaneously adjust the angular position of the individual stator blades connected together by the described linkage system. For a further and more detailed description of such a linkage system, reference is made to U.S. Patent No. 3,314,595 in the names of Joseph C. Burge and Richard W. Follmer.

As was previously indicated, it is desirable that maximum flow rates and velocities be maintained through the compressor 14 in order to obtain a high mass air flow. In doing so, air flow over the airfoil surfaces of the rotor and stator blades approaches a stall condition wherein there is a separation of the air stream from the blade surface and a consequent loss of pressurization. In many instances, incipient stall conditions occur in a segment of rotor blades of a given stage. If corrective action is not taken, or if the cause of the original stall is not removed, this "pocket" stall condition will spread to the entire stage and then other stages of the compressor eventually causing a "gross" stall and rendering the compressor essentially inoperative. A "pocket" stall may occur in a rotor or stator row and may be stationary or may rotate about the compressor axis. The angular location of a stationary "pocket" stall is usually predictable and related to the location of supporting frame structure between the outer casing and the support for the bearing journaling the rotor 16.

To detect "pocket" stalls in the first stage of the compressor seen in FIGURE 1, pressure sensors in the form of probes 40, 42 are disposed between the stators 22 of that stage. The probes 40, 42 are so spaced that under normal operating conditions essentially the same total air stream pressure is effective on each probe.

At this point, it will be noted that fluidic controls are advantageously employed in the present embodiment. To this end a conduit 44 is pressurized from the discharge of the compressor 12. The conduit 44 is connected to probes 46 and 48 through pressure dropping orifices 50. Air is thus continuously discharged from the probes 40 and 42 into the air stream of the compressor. The pressure in the conduits 46 and 48 reflects the back pressure of the air stream on the probes. The pressures of these conduits provides inputs to a fluid amplifier 52 which has a power stream nozzle 54 connected to the high pressure conduit 44 and discharges a power stream towards output receivers 56 and 58, as well as a central receiver 60, which is vented to atmosphere. The sensed pressure of conduits 46 and 58 is connected to control ports 62, 64 on opposite sides of the power stream discharge from the nozzle 54. The receivers 56 and 58 are connected to a common passageway or conduit 66, one end of which is connected to a fluid amplifier 68 and the other end of which is vented to atmosphere through an orifice 70.

The fluid amplifier 68 comprises a power nozzle 72 which is also connected to high pressure conduit 34. Control ports 74, 76 are disposed on opposite sides of the power stream, and receivers 78, 80 are downstream thereof. The receiver 80 is connected by a conduit 82 to a transducer 84 which, for example, might be of the piezoelectric type to provide an electrical control signal transmitted by line 86 to a control valve 88 for regulating flow of pressurized fluid through the conduits 44, 46, leading to the actuator 32.

As was indicated above, under normal operating conditions of the compressor, i.e. without any stall condition, the circumferential pressure profile at the first compressor stage (as well as at other stages) will be essentially constant. This is evidenced by equal pressures at the sensors 40 and 42 which are spaced 180° apart angularly of the compressor axis. Thus there will be equal pressure inputs in the control ports 62 and 64 of the fluid amplifier 52. The power stream from nozzle 54 will be discharged through the central receiver 60, and the receivers 56 and 58 will not be pressurized. Consequently, the receivers will be at ambient pressure by reason of the provision of vents 90. Since the conduit 66 is also vented to atmosphere through the orifice 70, the control port 74 of fluid amplifier 68 will likewise be at ambient pressure, as will control port 76 which is directly ported to ambient pressure. Under these circumstances, the power stream from nozzle 72 will be discharged through receiver 78 and vented to atmosphere.

Assuming that a pocket stall occurs, as would be evidenced by a pressure differential sensed by the probes 40 and 42, there will be a pressure differential between the control ports 62, 64 of the fluid amplifier 52. It does not matter which of the probes 40 and 42 sense the higher pressure since the power stream from nozzle 54 will cause an increase in pressurization in the conduit 56 which is connected to both of the receivers 56 and 58. Thus, a pressure signal or stall warning signal is provided at the control port 74 (of amplifier 68) which results in an amplified stall warning signal in conduit 82 to the transducer 84. A resultant signal is then fed to the control valve 88 to properly direct fluid to conduits 34, 36 to displace the lever arm 30 and advance the stator vanes 22 so as to reduce the aerodynamic loading on the compressor.

When the "pocket" stall is removed by reducing the loading on the compressor, the pressures sensed by the probes 40, 42 will again be equal and the stall warning signal applied to transducer 84 will be removed. Removal of the signal through 86 to the control valve 88 will result in the adjustable stators being returned to their normal operation position. Probes 40′, 42′ are also provided in the last compression stage of the compressor 12. Since the pressure in the last stage is essentially the same as at the compressor discharge, lines 46′, 48′ connect these probes directly to a fluid amplifier 52′ which may be of identical construction with the amplifier 52 (component portions are not specifically designated by reference characteristics) to provide a stall warning signal in a conduit 66′. This stall warning signal may be amplified by fluid amplifier 68′ which is identical with the fluid amplifier 68 and provides an amplified stall warning signal in conduit 82′, and likewise provides a signal from transducer 84 to control valve 88.

The illustrated probes 40′, 42′ illustrate the fact that stall conditions can originate in any of the various stages of a compressor. It is, therefore, contemplated that probes would be provided in any stage where experience or analysis indicates stall may originate. The stall warning signals, as shown, may be fed to a single control means for reducing the load on the compressor to eliminate the stall conditions before a "gross" stall occurs.

The probes 40′, 42′ also illustrate that an angular spacing of 180° (as in the case of probes 40, 42) is not required, but it would be pointed out that a minimum spacing is approximately 30°.

The described system also adapts itself to the introduction of a false stall warning signal, as by putting a pressure input signal to one of the conduits 46 or 48 to purposely reset the stator vanes where a condition of hot gas ingestion into the compressor is to be encountered, as in operation of a thrust reverser or a firing of rockets from a plane propelled by the engine.

While it is preferred to reduce the aerodynamic loading of the compressor by adjusting the angle of the stator vanes, as described, it is to be understood that other means could be employed for this purpose such as by bleeding air from the compressor discharge or reducing fuel flow to the compressor downstream of the compressor. These and other variations from the described embodiment will occur to those skilled in the art within the scope of the present inventive concepts which is therefore to be derived solely from the following claims.

Having thus described the invention, what is claimed as novel and desired to be secured by Letters Patent of the United States is:

1. In an axial flow compressor having at least one stage of compression,
   a pair of pressure sensors angularly spaced relative to said compression stage and providing fluid pressure signals,
   a fluid amplifier having a nozzle from which a power stream is directed,
   a pair of control ports opening on opposite sides of the power stream,
   a pair of output receivers downstream of said control ports and laterally offset to either side of said nozzle,
   a venting receiver aligned with said nozzle,
   a passageway interconnecting said output receivers,
   said pressure sensors being respectively connected to said control ports whereby a higher pressure signal from either sensor will deflect the power stream toward one of the output receivers and produce a stall warning signal in said interconnecting passageway, and
   means for reducing the aerodynamic loading on said compressor stage in response to said stall warning signal.

2. In an axial flow compressor, as in claim 1, wherein,
   a second fluid amplifier is provided having a nozzle from which a power stream is discharged,
   a control port on one side of said power stream and receiver means downstream of said control ports,
   said interconnecting passageway being connected to said one control port of said second amplifier to provide an amplified stall warning signal from said receiver means.

3. In an axial flow compressor, as in claim 1, having a plurality of stages of compression and comprising a rotor having axially spaced, circumferential rows of blades and alternating rows of stator blades, each adjacent row of rotor and stator blades forming a compressor stage, the stators of at least the initial compressor stages being pivotal about axes radial of the compressor rotor wherein,
   the means for reducing the aerodynamic loading on said compressor stage being responsive to said stall warning signal and comprising means for adjusting the angles of said pivotal stators.

4. In an axial flow compressor, as in claim 3, wherein,
   means are provided for generating a stall warning signal in at least one other compressor stage in the same fashion as in said one stage and
   the means for reducing the aerodynamic loading on the compressor is responsive to a stall warning signal from any stage.

References Cited

UNITED STATES PATENTS

| | | | |
|---|---|---|---|
| 2,390,043 | 12/1945 | Borden | 230—115 |
| 2,455,292 | 11/1948 | Borden | 230—115 |
| 3,248,043 | 4/1966 | Taplin | 230—115 |
| 3,327,933 | 6/1967 | Baumann | 230—114 |

ROBERT M. WALKER, *Primary Examiner.*